(12) United States Patent
Vaduganathan et al.

(10) Patent No.: US 9,179,166 B2
(45) Date of Patent: Nov. 3, 2015

(54) MULTI-PROTOCOL DEBLOCK ENGINE CORE SYSTEM AND METHOD

(75) Inventors: Visalakshi Vaduganathan, Fremont, CA (US); Harikrishna Madadi Reddy, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1182 days.

(21) Appl. No.: 12/329,491

(22) Filed: Dec. 5, 2008

(65) Prior Publication Data

US 2010/0142623 A1    Jun. 10, 2010

(51) Int. Cl.
*H04N 11/02* (2006.01)
*H04N 19/86* (2014.01)
*H04N 19/42* (2014.01)

(52) U.S. Cl.
CPC .............. *H04N 19/86* (2014.11); *H04N 19/42* (2014.11)

(58) Field of Classification Search
CPC ................. H04N 19/00814; H04N 19/00909; H04N 19/86; H04N 19/42
USPC ............................ 375/240.24, 240.25, 240.29
See application file for complete search history.

(56) References Cited

U.S. PATENT DOCUMENTS

| | | | |
|---|---|---|---|
| 6,907,079 B2 | 6/2005 | Gomila et al. | |
| 6,917,310 B2 | 7/2005 | Pearson et al. | |
| 7,372,905 B2 | 5/2008 | Foo et al. | |
| 7,421,025 B2 | 9/2008 | Wang et al. | |
| 7,590,059 B2 * | 9/2009 | Gordon | 370/230 |
| 7,747,088 B2 * | 6/2010 | Graham et al. | 382/232 |
| 7,796,692 B1 | 9/2010 | Falardeau et al. | |
| 7,796,792 B2 | 9/2010 | Behiels | |
| 7,953,161 B2 * | 5/2011 | Gordon | 375/240.29 |
| 8,036,517 B2 * | 10/2011 | Smith et al. | 386/354 |
| 8,090,028 B2 * | 1/2012 | Hellman | 375/240.24 |
| 8,116,379 B2 * | 2/2012 | Dang | 375/240.24 |
| 8,520,739 B2 * | 8/2013 | Caviedes et al. | 375/240.24 |

(Continued)

FOREIGN PATENT DOCUMENTS

| | | |
|---|---|---|
| JP | 11205792 | 7/1999 |
| JP | 2002501691 | 1/2002 |

(Continued)

OTHER PUBLICATIONS

Lee et al.; Modular and efficient architecture for H.263 video codec VLSI; Published in: Circuits and Systems, 2002. ISCAS 2002. IEEE International Symposium on (vol. 5 ); Date of Conference: 2002; pp. V-125-V-128 vol. 5; IEEE Xplore.*

(Continued)

*Primary Examiner* — Bradley Holder

(57) ABSTRACT

The present invention facilitates efficient and effective detection of pixel alteration. The number and configuration of pixels in a block partition can be flexibly changed. The filter inputs in the multi-protocol filter can be flexibly changed to meet the deblocking requirement in the target video compression standard. In one embodiment, the deblock engine includes an input interface, a neighbor buffer, a current data buffer; and a multi-protocol filter. The input interface receives reconstructed data. The neighbor buffer temporarily stores neighbor information. The current data buffer receives the reconstructed data and the neighbor information. The multi-protocol filter filters information selected from the reconstructed data and neighbor information.

18 Claims, 10 Drawing Sheets

(56) References Cited

U.S. PATENT DOCUMENTS

| | | | |
|---|---|---|---|
| 8,576,924 B2* | 11/2013 | Kwan et al. | 375/240.29 |
| 8,724,694 B2 | 5/2014 | Jia | |
| 8,761,538 B2 | 6/2014 | Pereira et al. | |
| 8,861,586 B2 | 10/2014 | Jia | |
| 8,867,605 B2 | 10/2014 | Jia | |
| 2005/0259744 A1* | 11/2005 | Hellman | 375/240.24 |
| 2006/0078052 A1 | 4/2006 | Dang | |
| 2006/0115002 A1 | 6/2006 | Kim et al. | |
| 2006/0245501 A1* | 11/2006 | Gordon et al. | 375/240.24 |
| 2006/0245503 A1* | 11/2006 | Gordon | 375/240.24 |
| 2006/0251174 A1* | 11/2006 | Caviedes et al. | 375/240.24 |
| 2006/0285757 A1 | 12/2006 | Abe et al. | |
| 2007/0071099 A1* | 3/2007 | Lee et al. | 375/240.12 |
| 2007/0071106 A1* | 3/2007 | Graham et al. | 375/240.24 |
| 2007/0171975 A1* | 7/2007 | Smith et al. | 375/240.13 |
| 2008/0056350 A1 | 3/2008 | Lyashevsky et al. | |
| 2008/0101718 A1 | 5/2008 | Yang et al. | |
| 2008/0123750 A1* | 5/2008 | Bronstein et al. | 375/240.24 |
| 2008/0159407 A1 | 7/2008 | Yang et al. | |
| 2008/0240253 A1* | 10/2008 | Au et al. | 375/240.24 |
| 2008/0298473 A1 | 12/2008 | Gou | |
| 2009/0003447 A1 | 1/2009 | Christoffersen et al. | |
| 2009/0010326 A1 | 1/2009 | Rossholm et al. | |
| 2009/0016430 A1* | 1/2009 | Schmit et al. | 375/240.01 |
| 2009/0129478 A1* | 5/2009 | Meroth | 375/240.24 |
| 2009/0304085 A1 | 12/2009 | Avadhanam et al. | |
| 2012/0189067 A1 | 7/2012 | Dang | |

FOREIGN PATENT DOCUMENTS

| | | |
|---|---|---|
| JP | 2006174138 | 6/2006 |
| JP | 2007251881 | 9/2007 |
| JP | 2008533863 | 8/2008 |
| KR | 1020000082892 | 12/2000 |
| KR | 1020020053336 | 12/2000 |
| TW | 200643825 | 12/2006 |
| WO | 2006013854 | 2/2006 |

OTHER PUBLICATIONS

Akeley; Reality Engine graphics; Published in: Proceeding SIGGRAPH '93 Proceedings of the 20th annual conference on Computer graphics and interactive techniques; 1993; pp. 109-116; ACM Digital Library.*

Zhongkang Lu et al., "An Adaptive Deblocking Filter for ROI-Based Scalable Video Coding", IEEE Multimedia and Expo, pp. 1347-1350 (Jul. 2007).

Chen et al., "Architecture Design of H.264/AVC Decoder With Hybrid Task Pipelining for High Definition Videos".

Cheng et al. "An In-Place Architecture for the Deblocking Filter in H.264/AVC", pp. 530-535.

Huang et al., "Architecture Design for Deblocking Filter in H.264/JVT/AVC".

Schoffmann, et al., "An Evaluation of Parallelization Concepts for Baseline-Profile Compliant H.264/AVC Decoders".

* cited by examiner

230

| 231 | 232 | 233 | 234 |
|-----|-----|-----|-----|
| 235 | 236 | 237 | 238 |
| 239 | 240 | 241 | 242 |
| 243 | 244 | 245 | 246 |

| | | | | | | | | | | | | | | | |
|---|---|---|---|---|---|---|---|---|---|---|---|---|---|---|---|
| | | | | |371|372|373|374| | | | | | | |
| | | | | |375|376|377|378| | | | | | | |
| | | | | |379|380|381|382| | | | | | | |
| | | | | |383|384|385|386| | | | | | | |

| 710 |
| --- |
| RECEIVING INPUT DATA. |

| 720 |
| --- |
| UTILIZING A MULTI-PROTOCOL DEBLOCKING ENGINE TO PERFORM FILTERING ON THE INPUT DATA IN ACCORDANCE WITH A PLURALITY OF PROTOCOLS TO CREATE OUTPUT RECONSTRUCTED DATA. |

| 730 |
| --- |
| FORWARDING THE OUTPUT RECONSTRUCTED DATA TO MEMORY. |

FIG. 7

MULTI-PROTOCOL DEBLOCK ENGINE CORE SYSTEM AND METHOD

FIELD OF THE INVENTION

The present invention relates to the field of video decoding.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Frequently, these activities involve video encoding and decoding. However, encoding and decoding can involve complicated processing that occupies valuable resources and consumes time. One such processing involved is a deblocking operation used to smoothen the blockiness of the image.

SUMMARY

The present invention facilitates efficient and effective deblocking of pixels in a sub-block partition. The systems and methods are readily adaptable for compliance with different video compression standards with minimal programming changes and maximum resource reusability. In one embodiment, the deblock engine includes an input interface, a neighbor buffer, a current data buffer, and a multi-protocol filter. The input interface receives reconstructed data. The neighbor buffer temporarily stores neighbor information. The current data buffer receives the reconstructed data and the neighbor information. The filter inputs in the multi-protocol filter can be flexibly changed or programmed to meet the deblocking requirement in the target video compression standard. The multi-protocol filter filters information selected from the reconstructed data and neighbor information.

DESCRIPTION OF THE DRAWINGS

The accompanying drawings, which are incorporated in and form a part of this specification, are included for exemplary illustration of the principles of the present and invention and not intended to limit the present invention to the particular implementations illustrated therein. The drawings are not to scale unless otherwise specifically indicated.

FIG. 2A is a block diagram of an exemplary 16 pixel by 16 pixel macroblock in accordance with one embodiment of the present invention.

FIG. 2B is a block diagram of exemplary 4 pixel by 4 pixel block within a 16 pixel by 16 pixel macroblock in accordance with one embodiment of the present invention.

FIG. 7 is a block diagram of an exemplary multi-protocol deblock method in accordance with one embodiment of the present invention.

DETAILED DESCRIPTION

Figure 1:
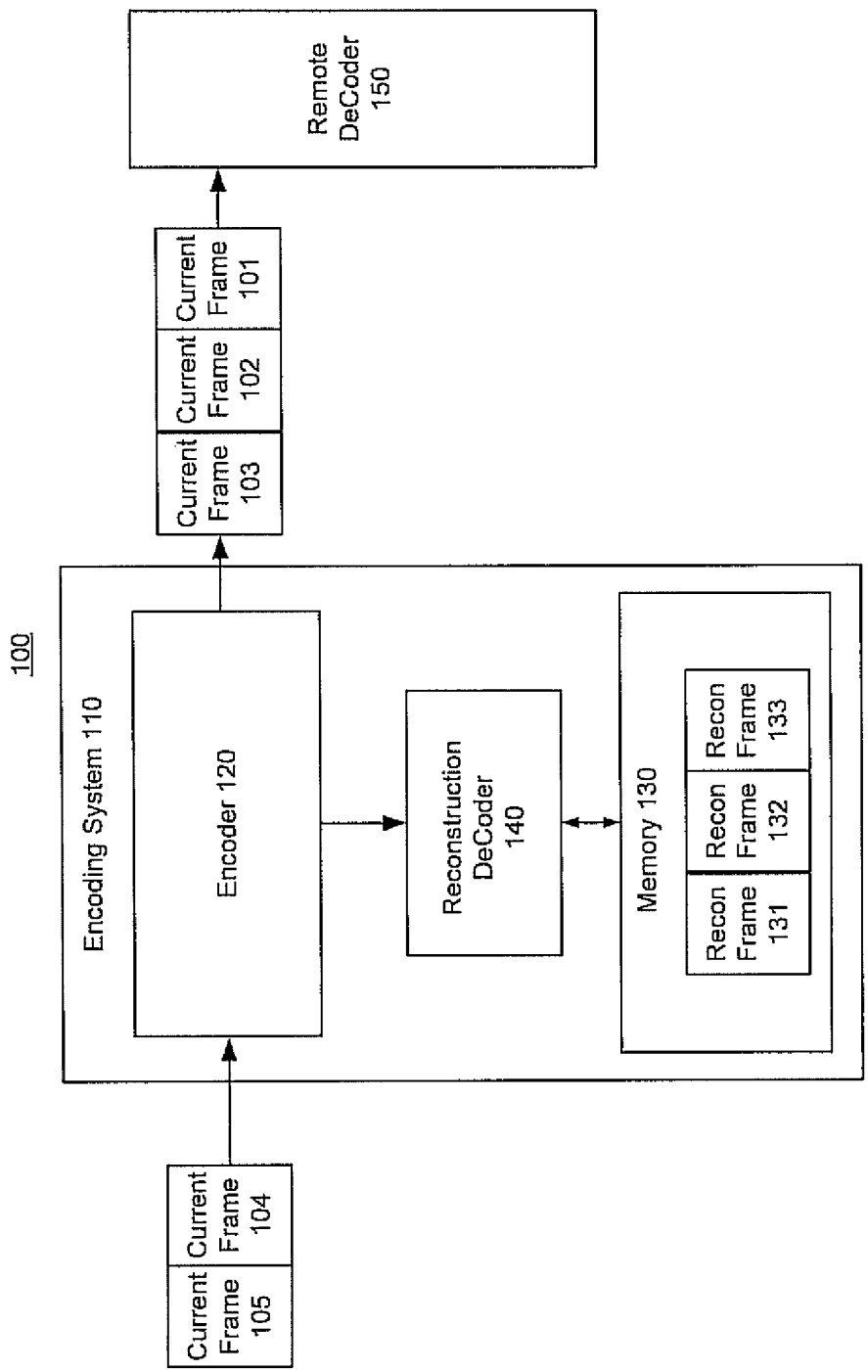
FIG. 1 is a block diagram of an exemplary encoding architecture in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The present invention facilitates effective and efficient deblocking operations. In one embodiment, a present invention deblocking filter core enables deblocking in accordance with multiple video compression protocols or video compression standards. In one embodiment, the deblocking filter core is common for different video compression standards facilitating conservation of chip resources and area. The deblocking filter can be used to smoothen sharp edges between neighboring blocks. The deblocking filter core can be utilized for in-loop deblocking or extended to out-of loop deblocking operations. Embodiments can also be readily implemented to hide memory latencies by sequencing memory requests from the deblock engine. Memory data accesses can be sequenced such that memory latency is hidden within a processing time period associated with a macroblock. In one exemplary implementation, sequencing the memory requests from the deblock engine reduces throttling impacts on an upstream encoder pipeline.

FIG. 1 is a block diagram of an exemplary encoding architecture 100 in accordance with one embodiment of the present invention. Encoding architecture 100 includes encoding system 110 and remote decoder 150. Encoding system 110 receives current frames (e.g., current frames 104 and 105) encodes the current frames, and then forwards the encoded current frames (e.g., current frames 101, 102 and 103 to remote decoder 150. Encoding system 100 includes encoder 120, reconstruction decoder 140 and memory 130. The encoder 120 encodes the frames and forwards them to remote decoder 150 and reconstruction decoder 140. Reconstruction decoder 140 decodes the frames and forwards them to memory 130 for storage as reconstructed frames 131, 132 and 133. In one exemplary implementation, the reconstructed frames 131, 132 and 133 correspond to current frames 101, 102 and 103. The frames include pixel values corresponding to image presentation.

It is appreciated the pixels can be configured or arranged in a variety pixel group or sub-group associations. FIG. 2A is a block diagram of exemplary 16 pixel by 16 pixel macroblock 230 in accordance with one embodiment of the present invention. In one exemplary implementation, the 16 pixel by 16 pixel macroblock 230 includes sixteen 4 pixel by 4 pixel sub-blocks 231 through 246. The present invention can be utilized to analyze the group or sub-groups of pixel association. Additional explanation of exemplary group and sub-group pixel value alteration analysis is set forth below. FIG. 2B is a block diagram of exemplary 4 pixel by 4 pixel sub-block within a 16 pixel by 16 pixel macroblock 250 in accordance with one embodiment of the present invention. The 4 pixel by 4 pixel sub-block includes pixels 371 through 386. It is appreciated that a macroblock and sub-blocks can be configured in a variety of different pixel boundary sizes (e.g., 16×16, 16×8, 8×8, 4×8, 4×4, etc.).

Figure 3:
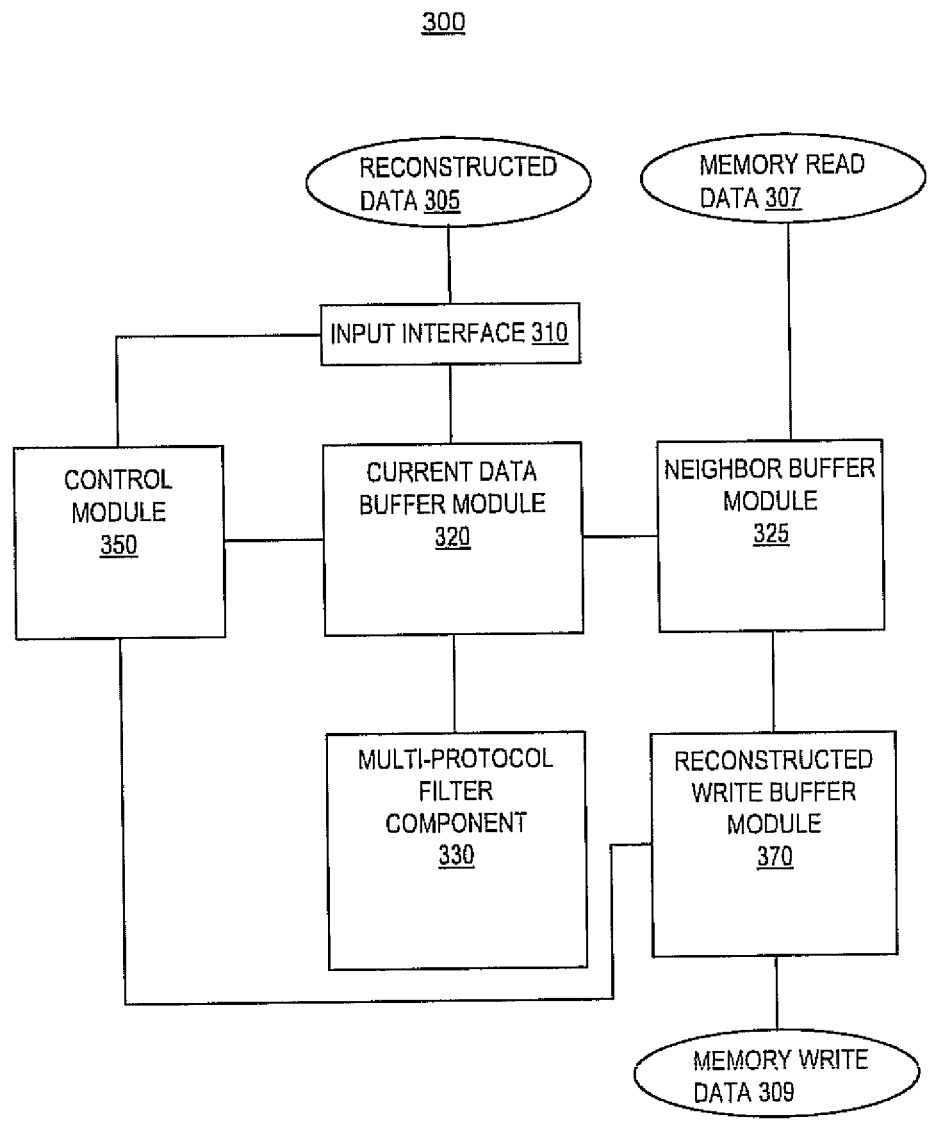
FIG. 3 is a block diagram of an exemplary deblock engine in accordance with one embodiment of the present invention.

FIG. 3 is a block diagram of exemplary deblock engine 300 in accordance with one embodiment of the present invention. Deblock engine 300 includes input interface 310, a neighbor buffer module 325, current data buffer module 320, multi-protocol filter component 330, control module 350, and reconstructed write buffer module 370. Current data buffer module 320 is communicatively coupled to input interface 310, multi-protocol filter component 330, control module 350, and a neighbor buffer module 325 which is coupled to reconstructed write buffer module 370.

The components of exemplary deblock engine 300 cooperatively operate to perform deblock filtering in accordance with a plurality of protocols or standards. Input interface 310 receives reconstructed data. Neighbor buffer module 325 temporarily stores neighbor information. Current data buffer module 320 receives the reconstructed data and the neighbor information. Multi-protocol filter component 330 filters information selected from the reconstructed data and neighbor information. The multi-protocol filter inputs can be changed in accordance with deblocking characteristics of different target video compression protocols or standards. Control module 350 directs the operations of the input interface, neighbor buffer, current data buffer and the multi-protocol filter. In one embodiment, control module 350 includes a main control component for directing the multi-protocol filter and current data buffer; an input interface control component for directing the input interface and a write buffer control component for directing reconstructed write buffer module 370 operations. Reconstructed write buffer module 370 buffers reconstructed write information and forwards the reconstructed write information to memory.

In one embodiment, the multi-protocol filter component 330 utilizes a common multi-protocol filter core to perform filtering in accordance with a plurality of standards. The multi-protocol core can perform a variety of multiplication and addition operations common to a variety of encoding standards. In one exemplary implementation the multi-protocol filter performs filtering in accordance with the following expression:

FO=(AI0 AI1 ... ]*[LS0 LS1 ... ]T+AIx+AIy)
>>RS0 where AI0, AI1, AIx and AIy are add inputs and LS0 and LS1 are left shift indicators and RS0 is a right shift indicator. It is appreciated the common multi-protocol filter core can be utilized with a variety of video protocols or standards. For example, the same common multi-protocol filter core can be utilized for H.264 deblock filtering, overlap filtering and bulk of deblock filtering defined in the VC1 video protocol or standard, or as an out-of-loop deblocking filter for MPEG 4 by changing the inputs to the common multi-protocol filter core.

Figure 4:
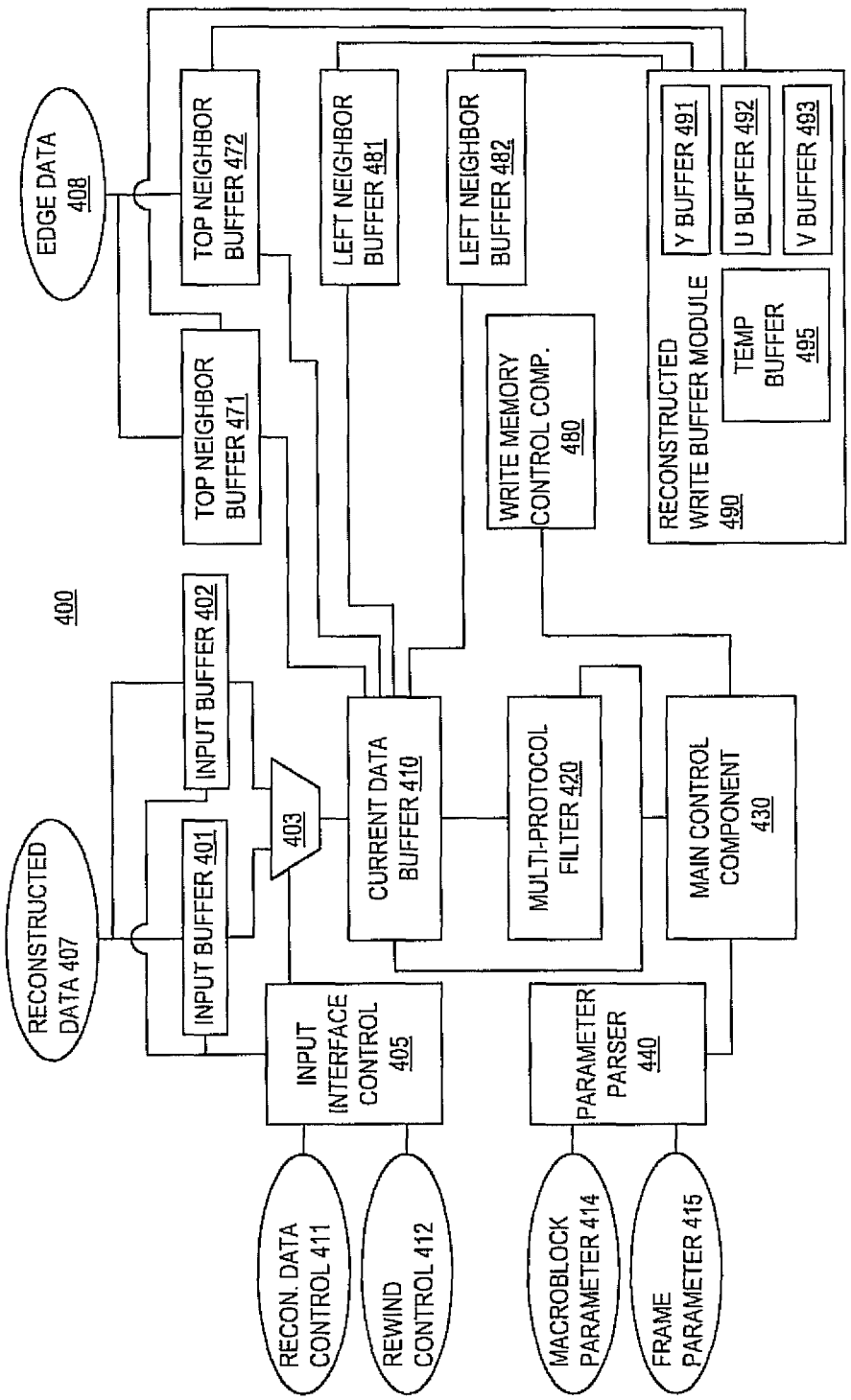
FIG. 4 is a block diagram of an exemplary deblock engine in accordance with one embodiment of the present invention.

FIG. 4 is a block diagram of exemplary deblock engine 400 in accordance with one embodiment of the present invention. Deblock engine 400 includes a first input buffer 401, a second input buffer 402, a selection component 403, input interface control 405, current data buffer 410, multi-protocol filter 420, main control component 430, parameter parser 440, top neighbor buffer 471, top neighbor buffer 472, left neighbor buffer 481, left neighbor buffer 482, write memory control component 480 and reconstructed write buffer module 490. Reconstructed write buffer module 490 includes luminance (Y) buffer 491, Cb chrominance buffer 492, Cr chrominance buffer 493 and temporary buffer 495. First input buffer 401, second input buffer 402, and selection component 403 are communicatively coupled to input interface control 405. Current data buffer 410 is communicatively coupled to selection component 403, multi-protocol filter 420, top neighbor buffer 471, top neighbor buffer 472, left neighbor buffer 481, and left neighbor buffer 482. Main control component 430 is communicatively coupled to parameter parser 440, current data buffer 410 multi-protocol filter 420, and write memory control component 480. Write memory control component 480 is communicatively coupled to reconstructed write buffer module 490 which is communicatively coupled to top neighbor buffer 471, top neighbor buffer 472, left neighbor buffer 481, and left neighbor buffer 482.

The components of exemplary deblock engine 400 cooperatively operate to perform deblock filtering in accordance with a plurality of protocols or standards. It is appreciated that the deblock engine 400 can be utilized with a variety of pixel macroblock and sub-block size configurations. In one exemplary implementation, the deblock engine 400 operates on a 4×4 block of pixels and receives 32 bits of reconstructed data (representing 4 pixels) from an upstream decoder/encoder and stores the information the input buffers. First input buffer 401 buffers reconstructed data associated with a first macroblock. Second input buffer 402 buffers reconstructed data associated with a second macroblock. Input interface control 405 informs main control component 430 of the status of input information and directs the forwarding of information from input buffer 401 and input buffer 402 to selection component 403. In one embodiment, selection component 403 is a multiplexer. Input interface control component 405 also directs selection of the inputs by selection component 403. Selection component 403 selects information from the first input buffer and second input buffer and forwards the information to current data buffer 410.

Current data buffer 410 receives information from selection component 403, top neighbor buffer 471, top neighbor buffer 472, left neighbor buffer 481, and left neighbor buffer 482. Current data buffer 410 forwards the information to multi-protocol filter 420. Multi-protocol filter 420 performs filtering operations. The filtering operations can be performed in accordance with a plurality of different protocols or standards. Main control component directs the operations of current data buffer 410, multi-protocol filter 420 and write memory control component 480 in accordance with parameters received from parameter parser 440. Reconstructed write buffer forwards the reconstructed data as directed by write memory control component 480.

In one embodiment, the reconstructed data control signal 411 controls when to sample the input reconstructed data and to which block (e.g., 4×4 block, etc.) the data belongs to. The two input buffers 401 and 402 can be utilized in a alternating back and forth or ping-pong fashion to enable reconstructed data of the next macroblock to be written to one input buffer while the deblock engine is processing the macroblock that is available in the other input buffer. The rewind control signal 412 indicates if there is a rewind. In one exemplary implementation, the input interface control 405 triggers the main control unit when one complete macroblock of reconstructed data is written into the input buffer 401 or 402 and the rewind decision is complete for that macroblock. The main control component 430 triggers the memory read state machine to fetch the top row macroblock data if it is not available in the top neighbor buffers, otherwise it begins the filtering operation.

In one embodiment, the macroblock parameter signal 414 and frame parameter signal 415 are input to parameter parser 440. These parameters can be used to determine if filtering is needed for a particular edge of a pixel sub-block (e.g., 4×4 sub-block edge, other sub-block size, etc.) and the required filter parameters defined in the video decode protocol or standard. The sub-block (e.g., 4×4, etc.) that needs to be filtered is fetch from an input buffer and is stored in the current data buffer 410. Also the neighboring left and top blocks are fetched from the left and top neighbor buffers (e.g., 471, 472, 481, and 482) and stored in the current data buffer (e.g., current data buffer 410). The corresponding pixels across the edges are input to the multi-protocol filter (420) and filtering is performed. In one exemplary implementation, it takes 5 cycles to filter a 4×4 pixel block.

Figure 5:
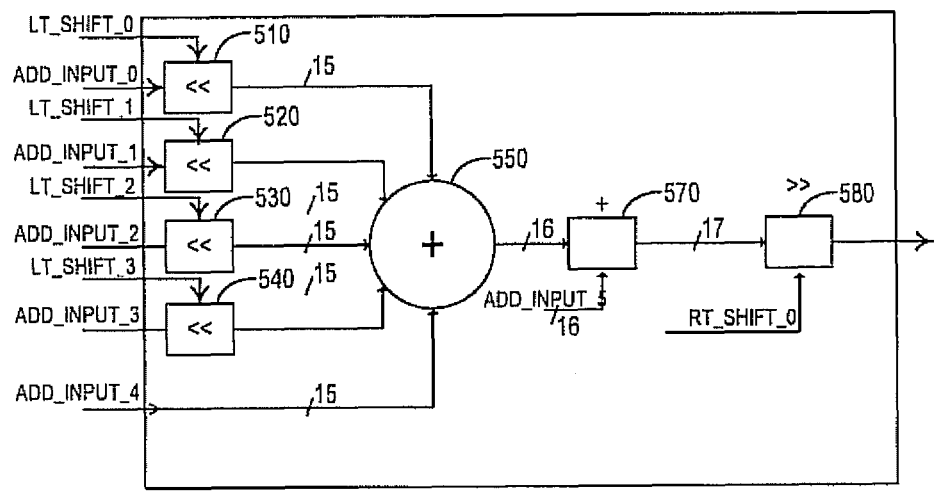
FIG. 5 is a block diagram of an exemplary multi-protocol engine core in accordance with one embodiment of the present invention.

FIG. 5 is a block diagram of exemplary multi-protocol engine core 500 in accordance with one embodiment of the present invention. Multi-protocol engine core 500 includes a plurality of left shift registers 510 through 540, a first adder component 550, a second adder component 570 and a right shift register 580. The plurality of left shift registers 510 through 540 are communicatively coupled to first adder component 550 which is communicatively coupled to second adder component 570 which in turn is communicatively coupled to right shift register 580.

The components of multi-protocol engine core 500 cooperatively operate to perform core deblock filtering operations. The plurality of left shift registers 510 through 540 receive a corresponding first plurality of inputs (e.g., add_input0 through add_input_3) and left shift the corresponding plurality of inputs. In one embodiment, the left shift is performed in accordance with left shift indication inputs (e.g., lt_shift_0 through lt_shift_3). First adder component 550 adds outputs of the plurality of left shift registers and a first unshifted input (e.g., add_input_4). Second adder component 570 adds the output of the first adder 550 to a second unshifted input (e.g., add_input_5). Right shift register 580 right shifts the output of the second adder component 570. The filter inputs can be programmed to meet the deblocking requirement in the target video compression standard.

Figure 6:
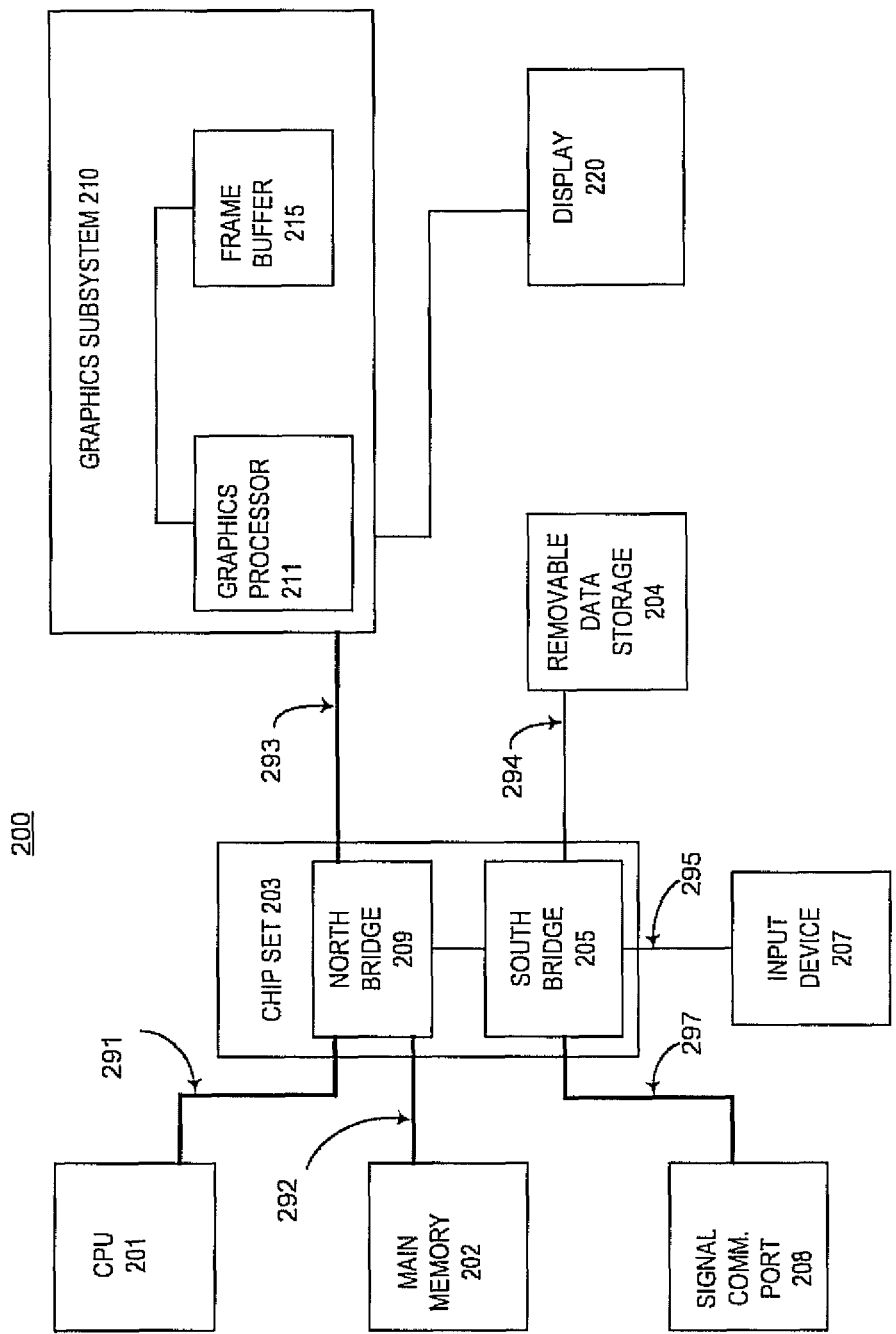
FIG. 6 is a block diagram of an exemplary computer system upon which embodiments of the present invention can be implemented.

With reference to FIG. 6, a block diagram of an exemplary computer system 200 is shown, one embodiment of a computer system upon which embodiments of the present invention can be implemented. Computer system 200 includes central processor unit 201, main memory 202 (e.g., random access memory), chip set 203 with north bridge 209 and south bridge 205, removable data storage device 204, input device 207, signal communications port 208, and graphics subsystem 210 which is coupled to display 220. Computer system 200 includes several busses for communicatively coupling the components of computer system 200. Communication bus 291 (e.g., a front side bus) couples north bridge 209 of chipset 203 to central processor unit 201. Communication bus 292 (e.g., a main memory bus) couples north bridge 209 of chipset 203 to main memory 202. Communication bus 293 (e.g., the Advanced Graphics Port interface) couples north bridge of chipset 203 to graphic subsystem 210. Communication buses 294, 295 and 297 (e.g., a PCI bus) couple south bridge 205 of chip set 203 to removable data storage device 204, input device 207, signal communications port 208 respectively. Graphics subsystem 210 includes graphics processor 211 and frame buffer 215.

The components of computer system 200 cooperatively operate to provide versatile functionality and performance. In one exemplary implementation, the components of computer system 200 cooperatively operate to provide predetermined types of functionality, even though some of the functional components included in computer system 200 may be defective. Communications bus 291, 292, 293, 294, 295 and 297 communicate information. Central processor 201 processes information. Main memory 202 stores information and instructions for the central processor 201. Removable data storage device 204 also stores information and instructions (e.g., functioning as a large information reservoir). Input device 207 provides a mechanism for inputting information and/or for pointing to or highlighting information on display 220. Signal communication port 208 provides a communication interface to exterior devices (e.g., an interface with a network). Display device 220 displays information in accordance with data stored in frame buffer 215. Graphics processor 211 processes graphics commands from central processor 201 and provides the resulting data to frame buffer 215 for storage and retrieval by display monitor 220.

FIG. 7 is a block diagram of multi-protocol deblock method 700 in accordance with one embodiment of the present invention.

In block 710 input data is received. The input data comprises pixel data corresponding to pixels across an edge of a 4 pixel by 4 pixel sub-block boundary both within a macroblock and along the edges between neighboring macroblocks. In one embodiment, a second set of reconstructed macroblock data is received and buffered while filtering on a first set of reconstructed macroblock data is performed. The input data to the multi-protocol deblock method can also include neighboring 4 pixel by 4 pixel sub-block data. In one exemplary implementation top row macroblock data is also fetched.

In block 720 multi-protocol deblocking engine is utilized to perform filtering on the input data in accordance with a plurality of protocols to create output reconstructed data. In one embodiment, a determination is made if filtering is required for an edge of the 4 pixel by 4 pixel sub-block and if filtering is required also determining the filter parameters to be used. In one exemplary implementation, the plurality of protocols are associated with a plurality of corresponding standards for compressing video.

In block 730 the output filtered reconstructed data is forwarded to memory. In one embodiment, the filtered reconstructed data is forwarded one row at time. In one exemplary implementation, macroblock parameters are also forwarded to be used for filtering the macroblock beneath it in the next row. The writes can be sequenced such that the luma data is written while processing the chroma of the current macroblock and the chroma data is written while processing the luma of the following macroblock, except in the case of the last macrobock in the frame where the chroma is written immediately.

In one embodiment, the top neighbor data needed for filtering the top horizontal edge of the macroblock is fetched from the reconstructed data memory and written into the top row neighbor buffer, one row at a time. The top neighbor buffers (e.g., 471, 472, etc.) and/or left neighbor buffers (e.g., 481, 482, etc.) can be utilized in an alternating or a ping pong fashion. While the deblock engine uses one buffer the top row data for the next macroblock is pre-fetched and written into the other buffer. Similarly the buffers for left neighbor data can be used to alternate or ping pong between left neighbor data and the current macroblock data.

Figure 8:
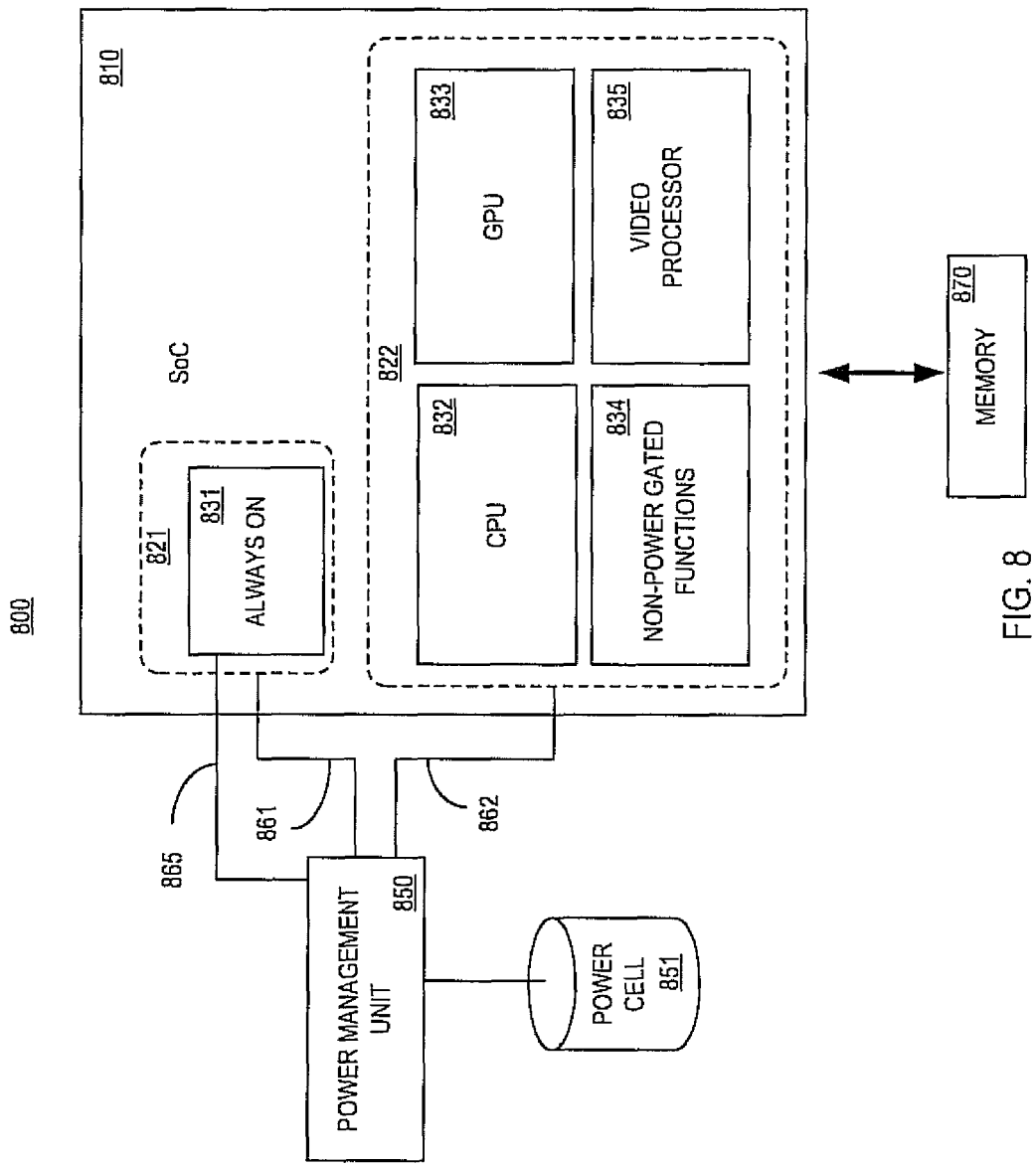
FIG. 8 shows an exemplary architecture that incorporates a video processor in accordance with one embodiment of the present invention.

FIG. 8 shows an exemplary architecture that incorporates an exemplary video processor or graphics processor in accordance with one embodiment of the present invention. As depicted in FIG. 8, system 800 embodies a programmable SOC integrated circuit device 810 which includes a two power domains 821 and 822. The power domain 821 includes an "always on" power island 831. The power domain 822 is referred to as the core of the SOC and includes a CPU power island 832, a GPU power island 833, a non-power gated functions island 834, and an instance of the video processor 825. The FIG. 8 embodiment of the system architecture 800 is targeted towards the particular intended device functions of a battery-powered handheld SOC integrated circuit device. The SOC 810 is coupled to a power management unit 850, which is in turn coupled to a power cell 851 (e.g., one or more batteries). The power management unit 850 is coupled to provide power to the power domain 821 and 822 via the dedicated power rail 861 and 862, respectively. The power management unit 850 functions as a power supply for the SOC 810. The power management unit 850 incorporates power conditioning circuits, voltage pumping circuits, current source circuits, and the like to transfer energy from the power cell 851 into the required voltages for the rails 861-862.

In the FIG. 8 embodiment, the video processor is within the domain 822. The video processor provides specialized video processing hardware for the encoding of images and video. As described above, the hardware components of the video processor are specifically optimized for performing real-time video encoding. The always on power island 831 of the domain 821 includes functionality for waking up the SOC 810 from a sleep mode. The components of the always on domain 821 will remain active, waiting for a wake-up signal. The CPU power island 832 is within the domain 822. The CPU power island 832 provides the computational hardware resources to execute the more complex software-based functionality for the SOC 810. The GPU power island 833 is also within the domain 822. The GPU power island 833 provides the graphics processor hardware functionality for executing 3-D rendering functions.

Figure 9:
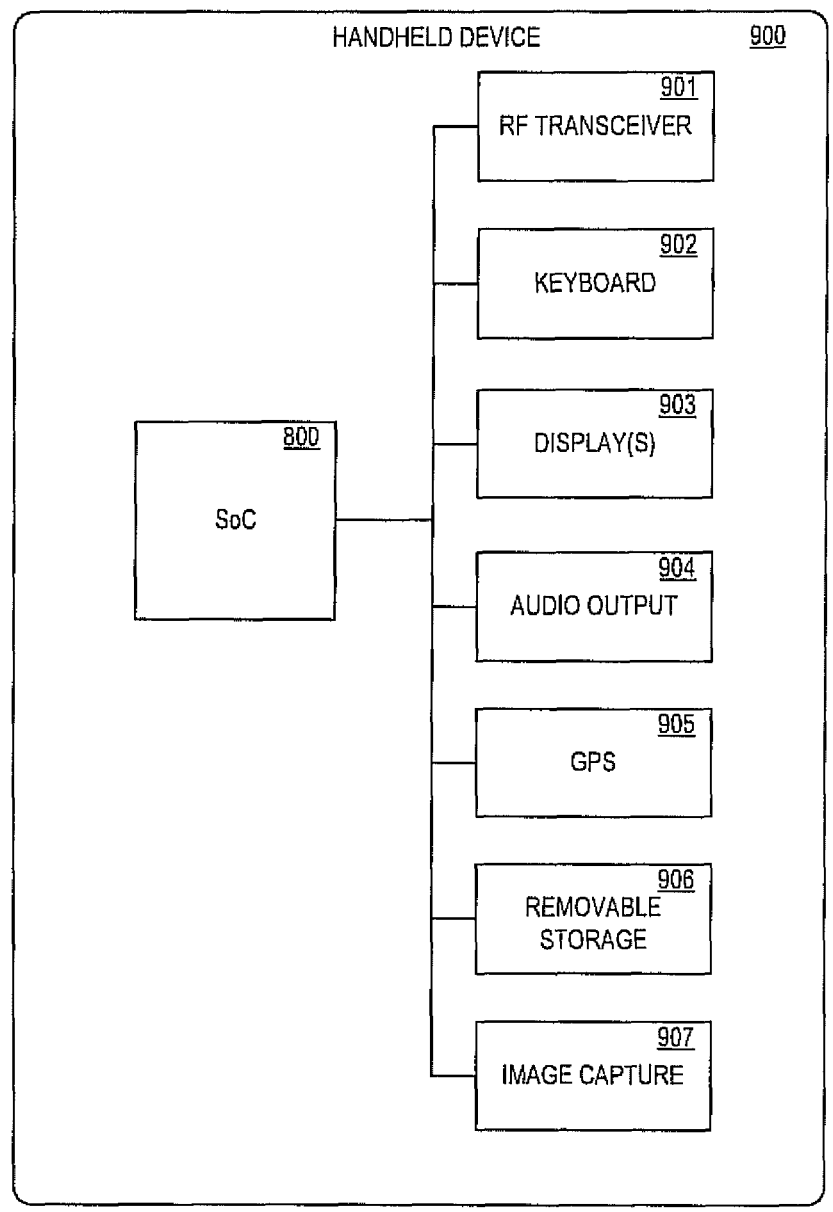
FIG. 9 shows a diagram showing the components of a handheld device incorporating a video processor in accordance with one embodiment of the present invention.

FIG. 9 shows a diagram showing the components of a handheld device 900 in accordance with one embodiment of the present invention. As depicted in FIG. 9, a handheld device 900 includes the system architecture 800 described above in the discussion FIG. 8. The handheld device 900 shows peripheral devices 901-907 that add capabilities and functionality to the device 900. Although the device 900 is shown with the peripheral devices 901-907, it should be noted that there may be implementations of the device 900 that do not require all the peripheral devices 901-907. For example, in an embodiment where the display(s) 903 are touch screen displays, the keyboard 902 can be omitted. Similarly, for example, the RF transceiver can be omitted for those embodiments that do not require cell phone or WiFi capability. Furthermore, additional peripheral devices can be added to device 900 beyond the peripheral devices 901-907 shown to incorporate additional functions. For example, a hard drive or solid state mass storage device can be added for data storage, or the like.

The RF transceiver 901 enables two-way cell phone communication and RF wireless modem communication functions. The keyboard 902 is for accepting user input via button pushes, pointer manipulations, scroll wheels, jog dials, touch pads, and the like. The one or more displays 903 are for providing visual output to the user via images, graphical user interfaces, full-motion video, text, or the like. The audio output component 904 is for providing audio output to the user (e.g., audible instructions, cell phone conversation, MP3 song playback, etc.). The GPS component 905 provides GPS positioning services via received GPS signals. The GPS positioning services enable the operation of navigation applications and location applications, for example. The removable storage peripheral component 906 enables the attachment and detachment of removable storage devices such as flash memory, SD cards, smart cards, and the like. The image capture component 907 enables the capture of still images or full motion video. The handheld device 900 can be used to implement a smart phone having cellular communications technology, a personal digital assistant, a mobile video playback device, a mobile audio playback device, a navigation device, or a combined functionality device including characteristics and functionality of all of the above.

Thus, the present invention facilitates efficient and effective deblock filtering. The deblock filtering operation is performed by a common core deblock engine component for a variety of video compression standards, thus conserving resources and die area. The information retrieval for the common core can be performed to minimize impacts associated with information retrieval latency. This also facilitates running the engine without throttling an upstream encoder pipeline.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the claim.

What is claimed is:

1. A deblock engine comprising:
an input interface for receiving reconstructed data;
a neighbor storage buffer for temporarily storing neighbor information;
a current data storage buffer for receiving the reconstructed data and the neighbor information; and
a multi-protocol filter for filtering information selected from the reconstructed data and the neighbor information, where the multi-protocol filter includes:
a plurality of left shift registers for receiving a corresponding first plurality of inputs and left shifting the corresponding first plurality of inputs;
a first adder hardware component for adding outputs of the plurality of left shift registers and a first unshifted input; and
a second adder hardware component for adding an output of the first adder to a second unshifted input; and
a right shift register for right shifting an output of the second adder hardware component.

2. The deblock engine of claim 1 where the multi-protocol filter utilizes a multi-protocol filter core to perform filtering in accordance with a plurality of standards.

3. The deblock engine of claim 1 where the multi-protocol filter performs filtering in accordance with the following expression:

$$FO=(Al0\ Al1\ \ldots\ ]*[LS0\ LS1\ \ldots\ ]T+Alx+Aly)>>RS0$$

where FO is filter output, Al0, Al1, Alx and Aly are add inputs, LS0 and LS1 are left shift indicators, T is a transpose, and RS0 is a right shift indicator.

4. The deblock engine of claim 1 further comprising a control circuit for directing operations of the input interface, the neighbor storage buffer, the current data storage buffer and the multi-protocol filter.

5. The deblock engine of claim 1 further comprising a reconstructed write storage buffer for buffering reconstructed write information and forwarding the reconstructed write information to memory.

6. The deblock engine of claim 1 where said input interface comprises:
a first input storage buffer for buffering reconstructed data associated with a first macroblock;
a second input storage buffer for buffering reconstructed data associated with a second macroblock; and
a selection hardware component for selecting information from the first input storage buffer and second input storage buffer.

7. The deblock engine of claim 1 further comprising a control circuit including:
a main control hardware component for directing the multi-protocol filter and current data storage buffer; and
an input interface control hardware component for directing the input interface.

8. The deblock engine of claim 1 where multi-protocol filter inputs are programmed to meet a deblocking requirement in a target video compression standard.

9. The deblock engine of claim 1 where data access requests from the deblock engine to memory are sequenced so that memory latency is hidden within a processing time period associated with a macroblock.

10. A multi-protocol deblock method comprising:
receiving input data;
determining if filtering is required for an edge of a block and if filtering is required also determining filter parameters to be used;
utilizing a multi-protocol deblocking engine to perform filtering on the input data in accordance with a plurality of protocols to create output reconstructed data, where the filtering is performed in accordance with the following expression:

$$FO=(Al0\ Al1\ \ldots\ ]*[LS0\ LS1\ \ldots\ ]T+Alx+Aly)>>RS0$$

where FO is filter output, Al0, Al1, Alx and Aly are add inputs, LS0 and LS1 are left shift indicators, T is a transpose and RS0 is a right shift indicator; and
forwarding the output reconstructed data to memory.

11. The multi-protocol deblock method of claim 10 further comprising receiving and buffering a second set of pixel block reconstructed data while performing filtering on a first set of pixel block reconstructed data.

12. The multi-protocol deblock method of claim 10 further comprising fetching top row macroblock data.

13. The mutli-protocol deblock method of claim 10 where the input data comprises pixel data corresponding to pixels across an edge of a 4 pixel by 4 pixel sub-block both within a macroblock and between neighboring macroblocks.

14. The multi-protocol deblock method of claim 10 where the input data comprises reconstructed data.

15. The multi-protocol deblock method of claim 10 where the input data comprises neighboring pixel data.

16. An encoding system comprising:
an encoder that encodes video data;
a reconstruction decoder that creates reconstructed data; and
a deblock engine that deblocks the reconstructed data, including performing filtering on the reconstructed data in accordance with a plurality of protocols utilizing a deblocking hardware core for performing the filtering, where the deblock engine performs filtering in accordance with the following expression:

$$FO=(Al0\ Al1\ \ldots\ ]*[LS0\ LS1\ \ldots\ ]T+Alx+Aly)>>RS0$$

where FO is filter output, Al0, Al1, Alx and Aly are add inputs, LS0 and LS1 are left shift indicators, T is a transpose and RS0 is a right shift indicator.

17. The encoding system of claim 16 where the deblock engine comprises:
an input interface that receives reconstructed data;
a neighbor storage buffer that temporarily stores neighbor information;
a current data storage buffer that receives the reconstructed data and the neighbor information; and
a multi-protocol filter that filters information selected from the reconstructed data and the neighbor information.

18. The encoding system of claim 16 where the plurality of protocols are associated with a plurality of corresponding standards for compressing video.

* * * * *